United States Patent [19]

Granzow

[11] 4,162,278

[45] Jul. 24, 1979

[54] FLAME RETARDANT POLYPHENYLENE ETHER RESIN COMPOSITIONS CONTAINING A PENTAERYTHRITYL PHOSPHONATE

[75] Inventor: Albrecht H. Granzow, Franklin Township, Somerset County, N.J.

[73] Assignee: American Cyanamid Company, Stamford, Conn.

[21] Appl. No.: 900,827

[22] Filed: Apr. 28, 1978

[51] Int. Cl.² ...................... C08L 51/00; C08L 53/00
[52] U.S. Cl. .................................. 525/2; 260/45.7 P
[58] Field of Search ............... 260/876 R, 876 B, 892, 260/45.7 P

[56] References Cited

U.S. PATENT DOCUMENTS

| 3,141,032 | 7/1964 | Friedman | 260/927 R |
| 3,976,725 | 8/1976 | Lee, Jr. | 260/876 R |
| 3,992,482 | 11/1976 | Kraft et al. | 260/876 R |

*Primary Examiner*—J. Ziegler
*Attorney, Agent, or Firm*—Bruce F. Jacobs

[57] ABSTRACT

Polyphenylene ether resin/rubber-modified, high-impact polystyrene thermoplastic compositions as rendered flame retardant by use of specific pentaerythrityl phosphonate compounds.

9 Claims, No Drawings

FLAME RETARDANT POLYPHENYLENE ETHER RESIN COMPOSITIONS CONTAINING A PENTAERYTHRITYL PHOSPHONATE

The present invention relates to flame retardant polyphenylene ether resin compositions containing a pentaerythrityl phosphonate flame retardant compound. More particularly, it relates to flame retardant rubber-modified polyphenylene ether thermoplastic resin compositions containing a pentaerythrityl phosphonate compound of the formula:

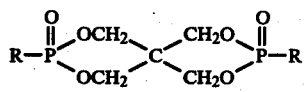

wherein R is selected from methyl, phenyl, benzyl, mono-, di- and trimethylbenzyl.

The compounds represented by the above formula are known. Friedman, U.S. Pat. No. 3,141,032, discloses compounds wherein R is alkyl of 1-18 carbon atoms, preferably 8 or more carbon atoms, as flame retardants for polyolefins and cellulose acetate.

German Offenleg No. 2,630,693 discloses compounds wherein R is alkyl (1-10 carbon atoms), cycloalkyl (5-7 carbon atoms), haloalkyl (1-3 carbon atoms), alkenyl (2-10 carbon atoms), phenyl or halogen-substituted phenyl; phenylalkyl (7-9 carbon atoms) or phenylalkenyl (8-10 carbon atoms), either of which may be substituted on the phenyl ring with a halogen atom. The compounds are disclosed as flame retardants for aromatic polyesters (e.g., polyethylene terephthalate).

Neither Friedman nor the German application suggests the use of the compounds as flame retardants for polyphenylene ether resins. The preferred compounds of Friedman (i.e., at least 8 carbon atoms) are not effective for flame retarding polyphenylene ether resins. While certain of the compounds of the German application, notably the phenyl and benzyl, are useful flame retardants for polyphenylene ether resins, others are not. Thus, there is no suggestion in either reference that the specific compounds of the present invention would be useful as flame retardants for polyphenylene ether resins, and the present invention would not be predictable in view of these disclosures.

The present invention provides flame retardant rubber-modified polyphenylene ether resin compositions by incorporating therein an effective flame retardant amount of a pentaerythrityl phosphonate of the formula;

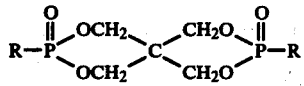

wherein R is selected from methyl, phenyl, benzyl, mono-, di- or trimethylbenzyl.

The compounds may be prepared by known procedures. The methyl and phenyl derivatives may be prepared by reacting, respectively, methylphosphonic dichloride and phenylphosphonic dichloride with pentaerythritol in methylene chloride or dioxane solvent at about 50° C., or in the absence of a solvent.

The compounds in general may be prepared via an Arbuzov-type rearrangement, in the presence or absence of a solvent, e.g., dioxane, by reacting an appropriate active-halogen compound, e.g., benzyl chloride (bromide) with a suitable dialkyl pentaerythrityl diphosphite, e.g., diethylpentaerythrityl diphosphite:

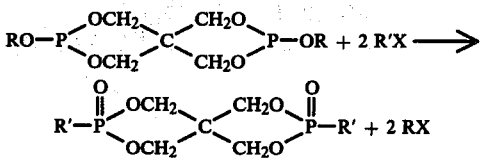

The polyphenylene ether resins useful herein may be prepared as described in U.S. Pat. No. 4,024,093, incorporated herein by reference. In particular, the polyphenylene ether resins for which the compounds of the present invention are useful are rubber-modified polyphenylene ether resins comprising 10 to 90 parts by weight of polyphenylene ether, preferably 20-50 parts by weight, and 90-10 parts by weight, preferably 50-80 parts by weight, of a styrene polymer. The styrene polymer is a rubber-modified, high-impact polystyrene. The resins are blends of the two polymers, which are mutually soluble, to form a homogeneous polymer composition.

The flame retardant pentaerythrityl phosphonate compound is used in the blended polyphenylene ether resin in an amount sufficient to provide a self-extinguishing composition as defined below. In general, the compound is effectively used in an amount of from about 5 to 20 percent by weight, preferably 6 to 10 percent by weight.

The flame retardant compound may be added to the polymer by any known method, such as by milling on a two-roll plastic mill or in a Banbury mixer; by dry-blending with the polymer and extruding, and the like.

It is also within the scope of the invention to incorporate such ingredients as plasticizers, dyes, pigments, heat and light stabilizers, antioxidants, antistatic agents, photochromic materials, and the like, into the polymer composition.

The following examples further illustrate the invention.

EXAMPLE 1

A total of 10 grams of a blend of polyphenylene ether/rubber-modified impact polystyrene (Noryl Type 731–General Electric Co.), containing 6 percent by weight of the pentaerythrityl phosphonate compound described in Table I, prepared by dry blending, was extruded through a Melt Index Apparatus (described in ASTM D-1238) at 290°–300° C. The cylindrical extrudate, 3–5 inches long and 0.25 inch diameter, was subjected to the following flammability test procedure described in Underwriters Laboratories Test UL94, Vertical Test Method 3.10–3.15 (September, 1973): The cylindrical polymer sample, clamped in a vertical position, is ignited with a ¾ inch blue flame (methane or natural gas) for 10 seconds, and the flame is withdrawn. If the flame is extinguished within 25 seconds, it is ignited again for 10 seconds and the flame again withdrawn. The flame extinguishment time is again recorded. If the flame extinguishment time does not exceed 5 seconds for either flame application, the sample is rated V-0; if the flame extinguishment time for either the first or second flame application is between 5 and 25 seconds, it is rated V-1. If a sample shows extinguishment times greater than 25 seconds for either flame application, it is rated free burning (FB) and is considered to have failed the test.

TABLE I
Flammability Test Results

| Sample | R | Flammability Rating* |
|---|---|---|
| A | —CH₃ | V-0; V-0 |
| B | 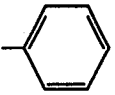 | V-1; V-1 |
| C | —CH₂— 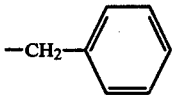 | V-1; V-1 |
| D | —CH₂— 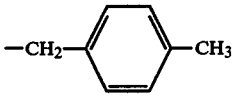 —CH₃ | V-1; V-0 |
| E | —CH₂— 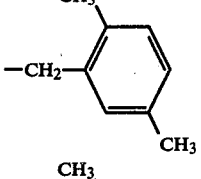 (CH₃, CH₃) | V-1; V-1 |
| F | —CH₂— 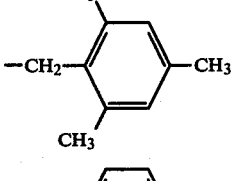 (CH₃, CH₃, CH₃) | V-1; V-1 |
| G | —CH₂— 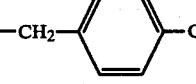 —Cl | FB; FB |
| H | —CH₂— 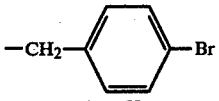 —Br | V-1; FB |
| I | —CH₂CH=CH₂ | FB; FB |

*two separate determinations

EXAMPLE 2

Dimethyl pentaerythrityl diphosphonate (A) was evaluated as described in Example 1 versus didecyl pentaerythrityl diphosphonate (J) and dioctadecyl pentaerythrityl diphosphonate (K), compounds described in Example 6 and Example 1, respectively, of Friedman, U.S. Pat. No. 3,141,032. Results are shown in Table II.

TABLE II

| Sample | Flammability Rating | Total Time to Flame Extinguishment* |
|---|---|---|
| A | V-0 | 16 seconds |
| J | V-1 | 55 seconds |
| K | FB | Failed |

*three specimens, two flame applications for each sample

EXAMPLE 3

The pentaerythrityl phosphonates shown below were evaluated according to the procedure of Example 1 except that they were incorporated into rubber-modified, high-impact polystyrene at a level of 8 percent by weight. None of the compounds passed the flammability test. The compounds evaluated are:
1. Dibenzyl pentaerythrityl diphosphonate*
2. Di(p-chlorobenzyl)pentaerythrityl diphosphonate
3. Di(p-bromobenzyl)pentaerythrityl diphosphonate
4. Diphenyl pentaerythrityl diphosphonate*
5. Dimethyl pentaerythrityl diphosphonate*
6. Didecyl pentaerythrityl diphosphonate
7. Dioctadecyl pentaerythrityl diphosphonate

* compounds of this invention.

EXAMPLE 4

The procedure of Example 1 was repeated while using 4 and 8% respectively of the designated pentaerythrityl phosphonate. The results, as shown in Table III, demonstrate that when only 4% of the phosphonate compounds are included, no flame retardancy occurred, whereas at 8% all of the samples were either V-0 or V-1.

TABLE III

| R | Flammability Rating at 4% | Flammability Rating at 8% |
|---|---|---|
| Methyl | FB; V-1 | V-0; V-0 |
| Phenyl | FB; FB | V-1; V-1 |
| Benzyl | FB; FB | V-1; V-1 |
| 4-Methylbenzyl | FB; FB | V-0 |
| 2,4-Dimethylbenzyl | FB; FB | V-0; V-0 |
| 2,4,6-Trimethylbenzyl | FB; FB | V-1; V-1 |

What is claimed is:

1. A flame retardant polyphenylene ether resin/rubber-modified, high-impact polystyrene thermoplastic composition comprising an effective flame retarding amount of a pentaerythrityl phosphonate compound represented by the formula:

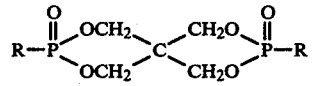

wherein R is methyl, phenyl, benzyl, or mono-, di- or trimethylbenzyl.

2. The composition of claim 1 wherein said molding composition comprises a homogeneous blend of 20 to 50 percent polyphenylene ether resin and 50 to 80 percent of rubber-modified, high-impact polystyrene resin.

3. The composition of claim 1 wherein each R is methyl.

4. The composition of claim 1 wherein each R is phenyl.

5. The composition of claim 1 wherein each R is benzyl.

6. The composition of claim 1 wherein each R is 4-methylbenzyl.

7. The composition of claim 1 wherein each R is 2,4-dimethylbenzyl.

8. The composition of claim 1 wherein R is 2,4,6-trimethylbenzyl.

9. The composition of claim 1 wherein the phosphonate is present in at least about 5% by weight of the composition.

* * * * *

Dedication 4,162,278.—*Albrecht H. Granzow*, Franklin Township, Somerset County, N.J. FLAME RETARDANT POLYPHENYLENE ETHER RESIN COMPOSITIONS CONTAINING A PENTAERYTHRITYL PHOSPHONATE. Patent dated July 24, 1979. Dedication filed Dec. 14, 1983, by the assignee, *American Cyanamid Co.*

Hereby dedicates to the Public the entire remaining term of said patent.

[*Official Gazette March 27, 1984.*]